United States Patent
Chiu et al.

(10) Patent No.: US 9,164,363 B2
(45) Date of Patent: Oct. 20, 2015

(54) PROJECTION APPARATUS

(71) Applicants: Sheng-Yu Chiu, Hsin-Chu (TW); Jung-Chi Chen, Hsin-Chu (TW)

(72) Inventors: Sheng-Yu Chiu, Hsin-Chu (TW); Jung-Chi Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 125 days.

(21) Appl. No.: 13/945,933

(22) Filed: Jul. 19, 2013

(65) Prior Publication Data
US 2014/0168617 A1    Jun. 19, 2014

(30) Foreign Application Priority Data

Dec. 18, 2012 (CN) .......................... 2012 1 0554532

(51) Int. Cl.
*G03B 21/16* (2006.01)
*G03B 21/14* (2006.01)
*G03B 21/20* (2006.01)
*H04N 9/31* (2006.01)

(52) U.S. Cl.
CPC .............. *G03B 21/14* (2013.01); *G03B 21/145* (2013.01); *G03B 21/16* (2013.01); *G03B 21/206* (2013.01); *H04N 9/3144* (2013.01)

(58) Field of Classification Search
CPC ... H04N 9/3129; H04N 9/3197; G03B 21/00; G03B 21/14; G03B 21/16
USPC .......... 353/38, 57, 85, 98, 122; 362/230, 553, 362/555; 348/68, 743–748
See application file for complete search history.

(56) References Cited

U.S. PATENT DOCUMENTS

| | | | |
|---|---|---|---|
| 6,155,687 A | 12/2000 | Peterson | |
| 6,386,708 B1 | 5/2002 | Arai et al. | |
| 6,588,907 B1 * | 7/2003 | Billington et al. | 353/57 |
| 7,275,833 B2 * | 10/2007 | Saito | 353/52 |
| 7,301,691 B2 | 11/2007 | O'Donnell | |
| 7,883,215 B2 * | 2/2011 | Chang et al. | 353/81 |

(Continued)

FOREIGN PATENT DOCUMENTS

| | | |
|---|---|---|
| CN | 101165588 | 4/2008 |
| GB | 2418997 | 4/2006 |

(Continued)

OTHER PUBLICATIONS

"Search Report of European Counterpart Application", issued on Apr. 4, 2014, p. 1-9, in which the listed references were cited.

(Continued)

*Primary Examiner* — Sultan Chowdhury
(74) *Attorney, Agent, or Firm* — Jianq Chyun IP Office (57) ABSTRACT

A projection apparatus includes a casing, a motherboard, a power board, a light source, and a projection lens. The motherboard includes a host circuit board, a light valve, and a CPU, and is contained inside the casing. The light valve and the CPU are on the host circuit board. The power board includes a power circuit board and an AC/DC power module. The power circuit board is contained inside the casing, and the AC/DC power module is on the power circuit board. The light source is used to produce an illuminating beam. The light valve is used to transform the illuminating beam into an image beam. The projection lens is used to transform the image beam into a projecting beam. The power circuit board is parallel to the host circuit board. An optical axis of the projection lens is perpendicular to the host circuit board and power circuit board.

10 Claims, 6 Drawing Sheets

(56) References Cited

U.S. PATENT DOCUMENTS

| | | |
|---|---|---|
| 2005/0083486 A1* | 4/2005 | Johnson .................. 353/15 |
| 2007/0195276 A1* | 8/2007 | Plut ......................... 353/31 |
| 2008/0094581 A1 | 4/2008 | Nakagawa et al. |
| 2009/0059186 A1* | 3/2009 | Wu et al. ................ 353/119 |
| 2009/0284148 A1 | 11/2009 | Iwanaga |
| 2010/0073581 A1 | 3/2010 | Chien et al. |
| 2011/0188008 A1* | 8/2011 | Maeda et al. ............ 353/85 |

FOREIGN PATENT DOCUMENTS

| | | |
|---|---|---|
| JP | 2003-315918 | 11/2003 |
| JP | 3598763 | 8/2004 |
| JP | 2004-334084 | 11/2004 |
| JP | 2006-208719 | 8/2006 |
| JP | 2007-078924 | 3/2007 |
| TW | 514350 | 12/2002 |

OTHER PUBLICATIONS

"Office Action of China Counterpart Application," issued on Apr. 29, 2015, p. 1-7, in which the listed references were cited.

* cited by examiner

PROJECTION APPARATUS

CROSS-REFERENCE TO RELATED APPLICATION

This application claims the priority benefit of China application serial no. 201210554532.0, filed on Dec. 18, 2012. The entirety of the above-mentioned patent application is hereby incorporated by reference herein and made a part of this specification.

BACKGROUND OF THE INVENTION

1. Field of Invention

The invention relates to an optical apparatus. More particularly, the invention relates to a projection apparatus.

2. Description of Related Art

A projection apparatus is an apparatus used to produce an image with large size. The imaging mechanism of the projection apparatus is that an illuminating beam generated by a light source is transformed into an image beam by a light valve and then the image beam is further transformed into a projecting beam by a projection lens, so as to project the projecting beam onto a screen or a wall to form an image. Due to the development of projecting technology and reducing the fabrication cost, the application of projection apparatus has extended from the use in business to the use in home.

For a conventional projection apparatus, the appearance of the conventional projection apparatus usually is a flat shape, so the circuit boards inside the conventional projection apparatus are usually divided into two circuit boards. One circuit board includes a digital micro or device (DMD) chip and a control module of the DMD chip. Another circuit board includes the central processing unit (CPU) of the projection apparatus. In addition, the signals between the two circuit boards are transmitted by an one-to-one connector or a flat cable. However, the above assembling manner may cause an abnormal image or an abnormal operation of the host, due to the factors of poor quality for the connector or the flat cable, poor assembly tolerance, and improper assembly. U.S. Pat. Nos. 6,155,687, 7,301,691, and 7,883,215 have disclosed an projection apparatus, of which the DMD chip is directly implemented on the motherboard to reduce abnormal effect due to the above factors of poor quality for the connector or the flat cable, poor assembly tolerance, and improper assembly.

Further, the electrical connector of the projection apparatus for communicating with an external device is usually implemented on the edge region of the motherboard and the port of the connector is exposed to an opening of the apparatus casing. As a result, the projection apparatus can receive the electronic signals from outside, such as the video signals, to correspondingly produce the image. However, when the appearance of the apparatus casing has been changed, the location of the connector on the motherboard has to be adjusted as well. This would cause re-design for the motherboard. The cost would increase. The U.S. Patent Publication 2010/0073581 also discloses a projector, which uses an expansion module by external attachment to receive the video signal.

SUMMARY OF THE INVENTION

The invention provides a projection apparatus, which has less volume.

The other objectives and advantages of the invention could be further comprehended from the disclosed features.

In order to achieve one or part or full of the above objectives or other objective, an embodiment of the invention provides a projection apparatus, including a casing, a motherboard, a power board, a light source, and a projection lens. The motherboard includes a host circuit board, a light valve, and a CPU. The host circuit board is contained inside the casing. The light valve is implemented on the host circuit board. The CPU is implemented on the host circuit board. The power board includes a power circuit board and an AC/DC power module. The power circuit board is contained inside the casing. The AC/DC power module is implemented on the power circuit board. The light source is contained inside the casing and used to produce an illuminating beam. The light valve is used to transform the illuminating beam into an image beam. The projection lens is contained inside the casing and used to transform the image beam into a projecting beam. The power circuit board is parallel to the host circuit board. An optical axis of the projection lens is perpendicular to the host circuit board and the power circuit board.

As for the foregoing disclosure, the embodiment of the invention could have at least one following advantage. In the above embodiments of the invention, the power circuit board is parallel to the host circuit board and the optical axis of the projection lens is perpendicular to the host circuit board and the power circuit board. This assembly could reduce the volume of the projection apparatus.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the Invention could be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
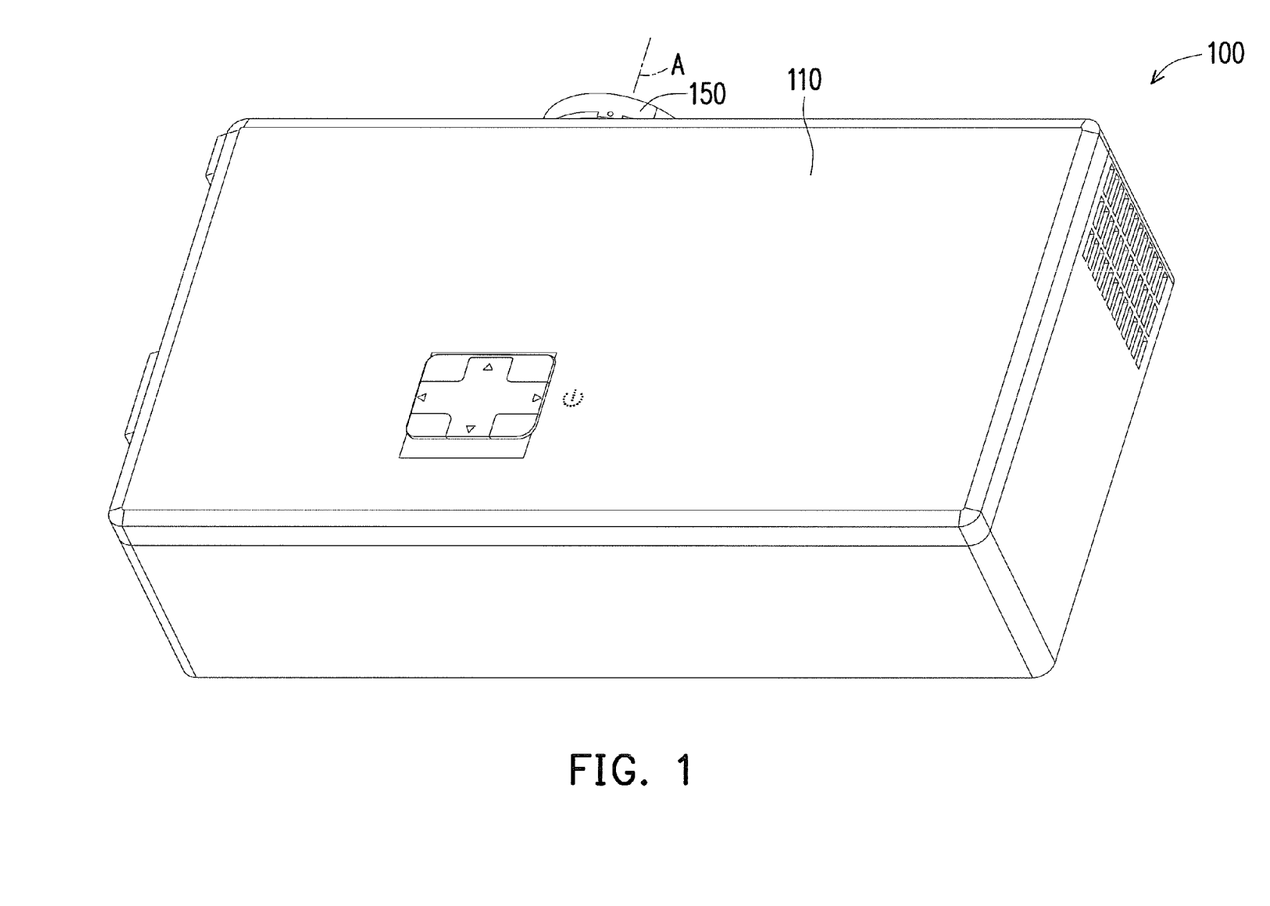
FIG. 1 is a perspective view illustrating a projection apparatus according to an embodiment of the invention.
Figure 2:
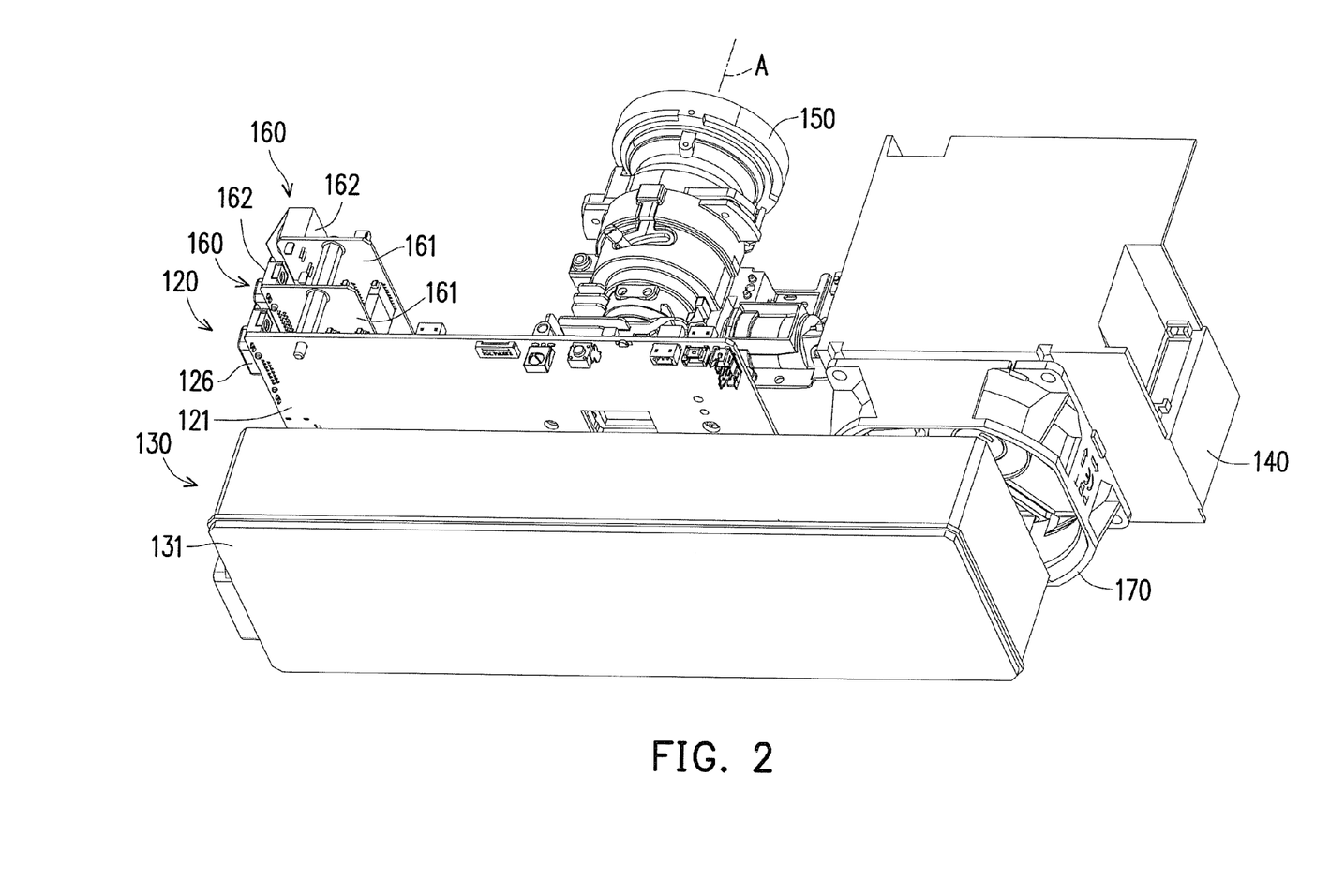
FIG. 2 is a perspective view illustrating parts of the projection apparatus in FIG. 1.

FIG. 1 is a perspective view illustrating a projection apparatus according to an embodiment of the invention. FIG. 2 is a perspective view illustrating parts of the projection apparatus in FIG. 1. Referring to FIG. 1 and FIG. 2, the projection apparatus 100 of the embodiment includes a casing 110, a motherboard 120, and a power board 130. The motherboard 120 and the power board 130 are implemented inside the casing 110.

Figure 3:
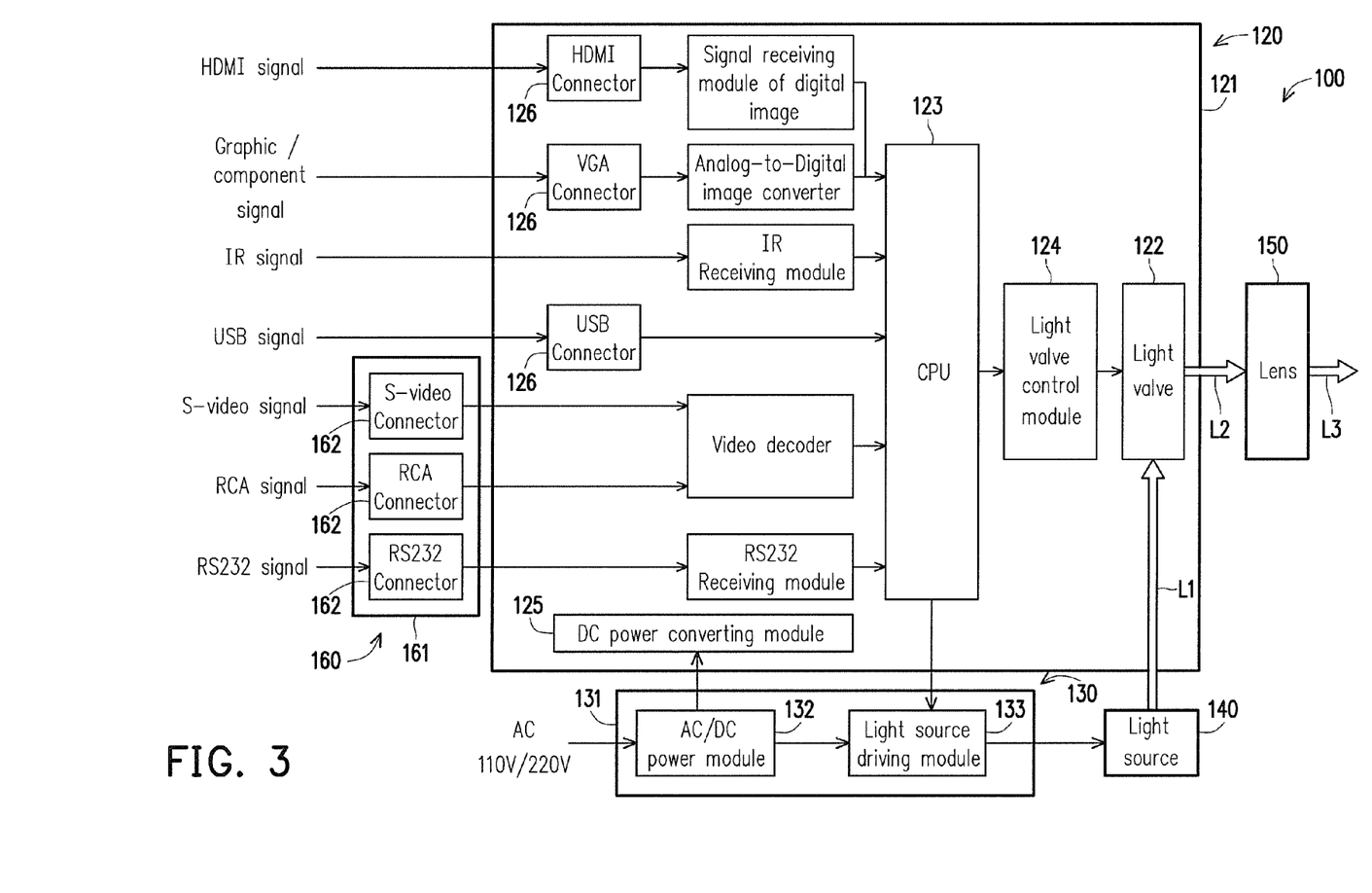
FIG. 3 is a block diagram illustrating the projection apparatus in FIG. 1.

FIG. 3 is a block diagram illustrating the projection apparatus in FIG. 1. Referring to FIG. 2 and FIG. 3, the motherboard 120 includes a host circuit board 121 and a light valve 122. The host circuit board 121 is contained inside the casing 110 as shown in FIG. 1. The light valve 122 is implemented on the host circuit board 121. The power board 130 includes a power circuit board 131, and the power circuit board 131 is contained inside the casing 110.

Referring to FIG. 2 and FIG. 3, the projection apparatus 100 further includes a light source 140 and a projection lens 150. The light source 140 is contained inside the casing 110 and used to provide an illuminating beam L1. The light valve 122 is used to transform the illuminating beam L1 into an image beam L2. The projection lens 150 is contained inside the casing 110 and used to transform the image beam L2 into a projecting beam L3.

Remarkably, the power circuit board 131 is parallel to the host circuit board 121, and an optical axis A of the projection lens 150, as shown in FIG. 2, is perpendicular to the host circuit board 121 and the power circuit board 131. By this assembly manner, the volume of the projection apparatus 100 could be reduced.

Referring to FIG. 3, the motherboard 120 further includes a central processing unit (CPU) 123, and the CPU 123 is implemented on the host circuit board 121. The CPU 123 is electrically coupled to the light valve 122 through the host circuit board 121 to control the light valve 122. In the embodiment, the motherboard 120 further includes a light valve control module 124. The light valve control module 124 is electrically connected to the light valve 122 and the CPU 123 through the host circuit board 121, to receive the instruction from the CPU 123 and then control the light valve 122.

Referring to FIG. 3, the power board 130 further includes an AC (alternating current)/DC (direct current) power module 132. The AC/DC power module 132 is implemented on the power circuit board 131.

In the embodiment, the power board 130 further includes a light source driving module 133. The light source driving module 133 is implemented on the power circuit board 131 and electrically connected to the light source 140 and the CPU 123 to receive the instruction from the CPU 123 and then to drive the light source 140.

In the embodiment, the motherboard 120 could further include a DC power converting module 125. The DC power converting module 125 is implemented on the host circuit board 121, to receive the direct current provided from the AC/DC power module 132.

Figure 4A:
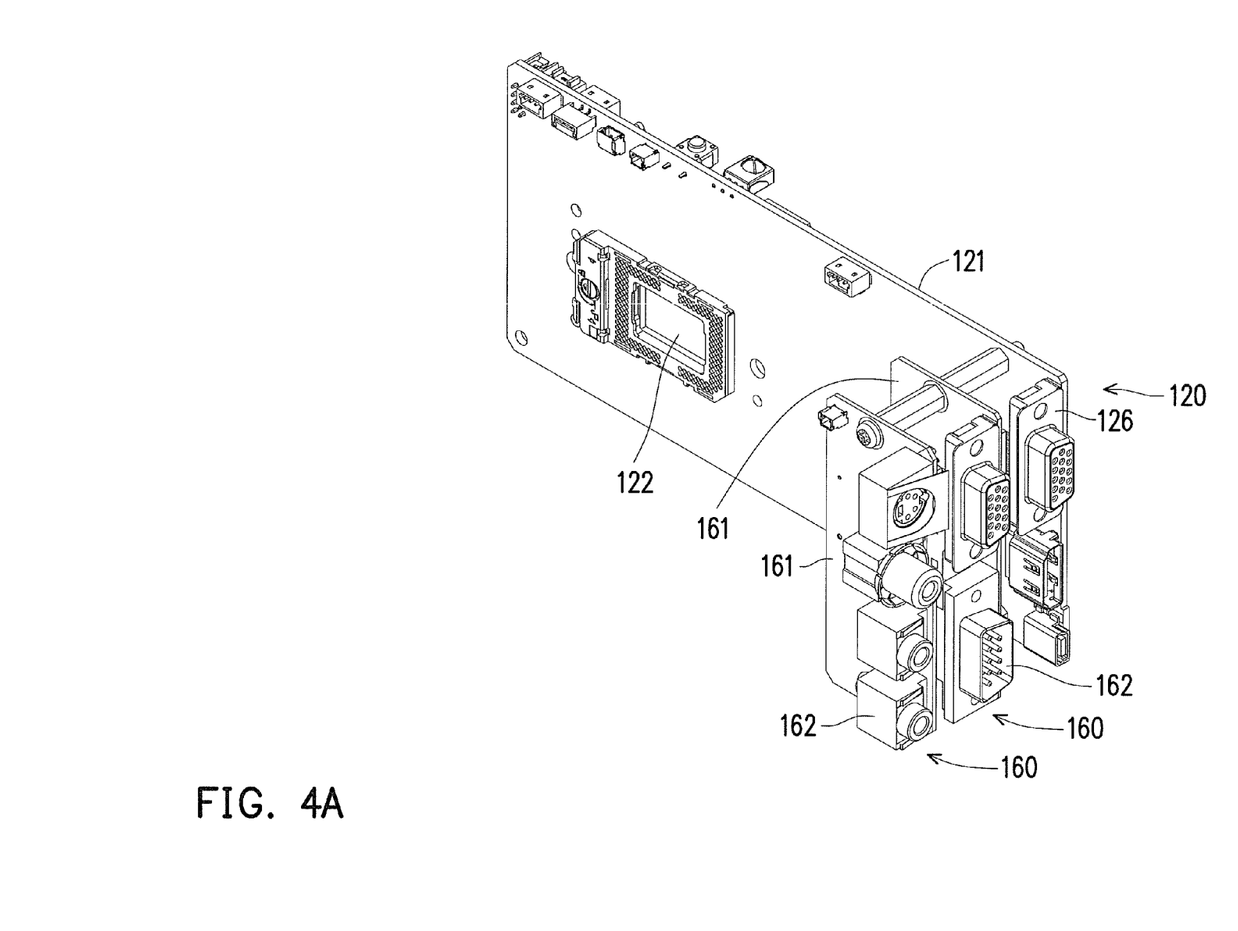
FIG. 4A is a perspective view illustrating the motherboard and the expansion board of the projection apparatus in FIG. 1.
Figure 4B:
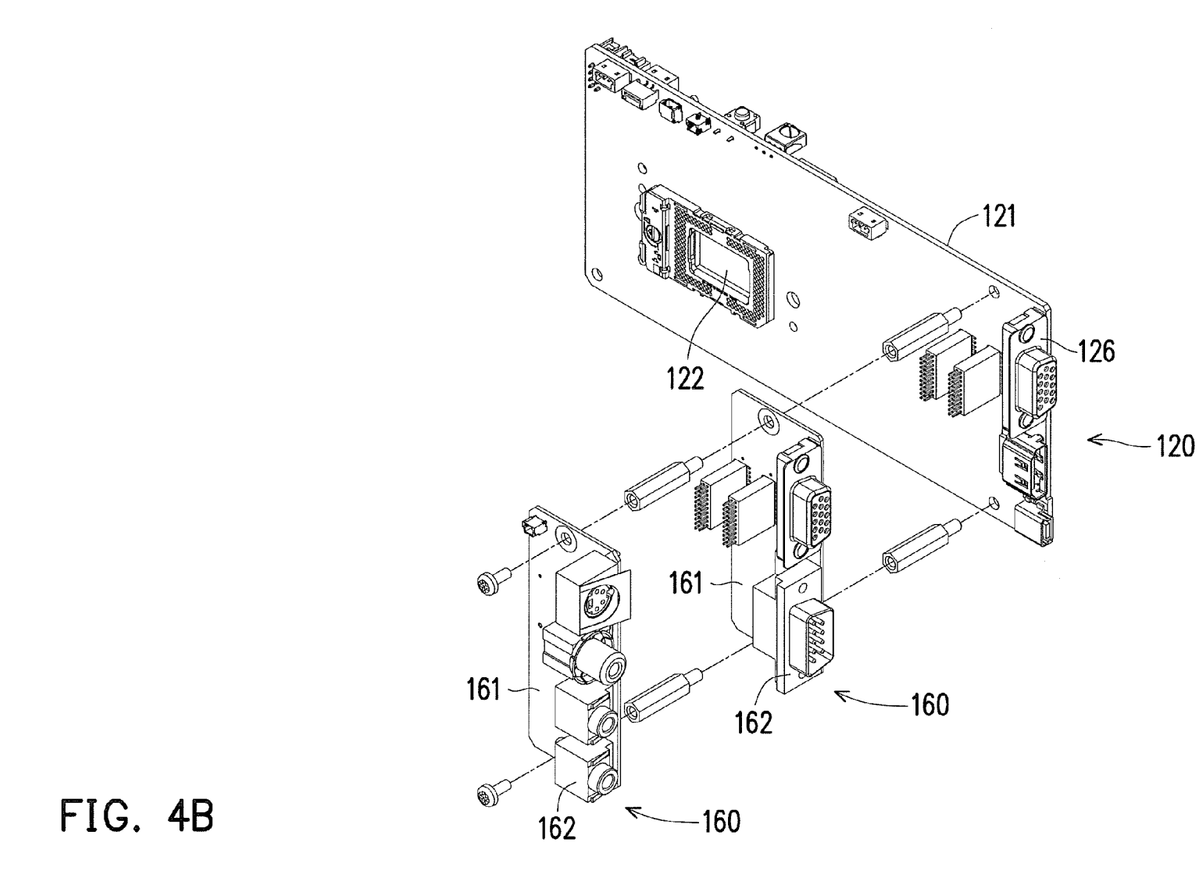
FIG. 4B is an exploded view illustrating the motherboard and the expansion board in FIG. 4A.

FIG. 4A is a perspective view illustrating the motherboard and the expansion board of the projection apparatus in FIG. 1. FIG. 4B is an exploded view illustrating the motherboard and the expansion board in FIG. 4A. Referring to FIG. 2, FIG. 4A and FIG. 4B, the projection apparatus 100 could include one or more expansion boards 160, which could be implemented on the host circuit board 121 by stacking with overlapping, as shown in FIG. 2.

In the embodiment, each expansion board 160 includes an expansion circuit board 161 and one or more expansion components 162. The expansion circuit board 161 is contained inside the casing 110, as shown in FIG. 1, and electrically connected to the host circuit board 121. The expansion components 162 are implemented on the expansion circuit board 161. In the embodiment, the expansion circuit board 161 is parallel to the host circuit board 121, and could be located at the same side as the location of the projection lens 150 on the host circuit board 121, but the invention is not limited to this configuration. The expansion components 162 could be treated as video connector, such as S-video connector, RCA connector and RS232 connector, and so on. These expansion components 162 could transmit the signals to the CPU 123, wherein the signals have been processed by corresponding circuit modules, such as video decoder, RS232 receiving module, and so on. One or more expansion boards 160 are implemented on the host circuit board 121 by stacking with overlapping, so the inner space of the projection apparatus 100 could be more efficiently used, and volume of the projection apparatus 100 could be reduced.

Referring to FIG. 3 and FIG. 4A, in the embodiment, the motherboard 120 could further include one or more electrical connectors 126, such as HDMI connector, VGA connector, and USB connector, and so on. These electrical connectors 126 have been implemented on the host circuit board 121 and could transmit the signals to the CPU 123, in which the signals have been processed by the corresponding circuit module, such as signal receiving module of digital image and analog-to-digital image converter and so on. However, the invention is not limited to this manner, the foregoing electrical connectors 126 could also be treated as the expansion components 162 and implemented on the expansion circuit board 161.

Figure 5:
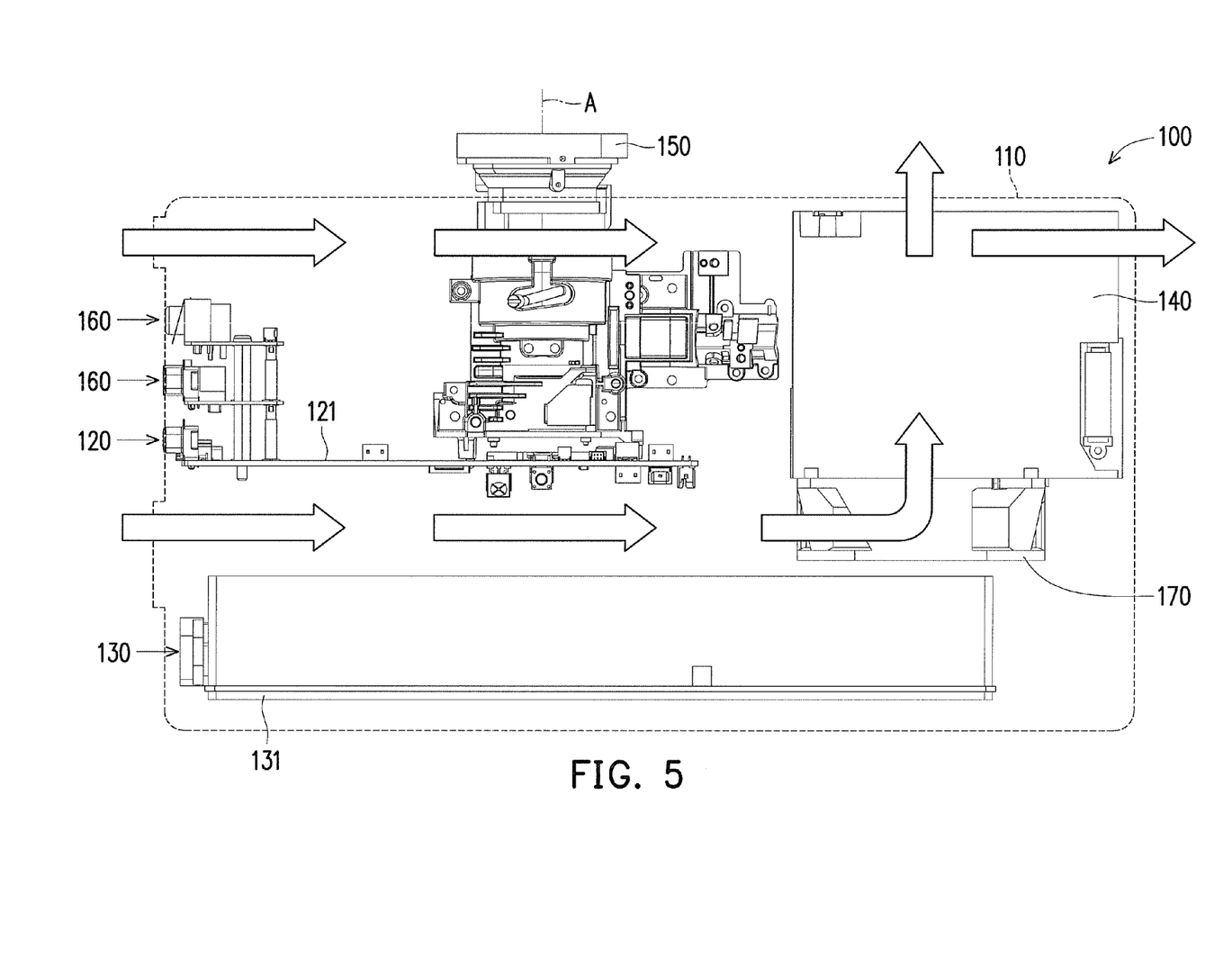
FIG. 5 is a drawing schematically illustrating a top view of the projection apparatus in FIG. 1.

FIG. 5 is a drawing schematically illustrating a top view of the projection apparatus in FIG. 1. To easily express the direction of air circulation, the outer appearance of the casing 110 in FIG. 5 is shown by dashed line. Referring to FIG. 2 and FIG. 5, the projection apparatus 100 could further include a fan 170. The fan 170 is contained inside the casing 110 and used to generate active air circulation. The active air circulation flows through the space between the host circuit board 121 and the power circuit board 131. In the embodiment, the space between the host circuit board 121 and the power circuit board 131 is located at the upstream of the active air circulation generated by the fan 170. The light source 140 is located at the downstream of the active air circulation generated by the fan 170.

As a summary, in the embodiments of the invention, the power circuit board is parallel to the host circuit board, and the optical axis of the projection lens is perpendicular to the host circuit board and the power circuit board. This structure allows the volume of the projection apparatus to be reduced. In addition, when the power circuit board is parallel to the host circuit board, the space between the host circuit board and the power circuit board could become as a channel for air circulation. It is helpful to cause fast flowing of the air circulation, so the effect of thermal dissipation could be improved. Further, the optional expansion components, such as video connector and electrical connector, could be moved to the expansion board. Therefore, a single motherboard could adapt with various expansion boards, so could be commonly used at various specifications of projection apparatus.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A projection apparatus, comprising: a casing, a motherboard, a power board, a light source, a fan, and a projection lens,
   wherein the motherboard comprises:
      a host circuit board, contained inside the casing;
      a light valve, implemented on the host circuit board; and
      a central processing unit (CPU), implemented on the host circuit board,
   wherein the power board comprises:
      a power circuit board, contained inside the casing; and
      an alternating-current (AC)/direct-current (DC) power module, implemented on the power circuit board;
      the light source contained inside the casing to generate an illuminating beam, wherein the light valve transforms the illuminating beam into an image beam; and
      the projection lens contained in the casing to transform the image beam into a projecting beam, wherein the power circuit board is parallel to the host circuit board, and an optical axis of the projection lens is perpendicular to the host circuit board and the power circuit board,
   wherein the fan is contained inside the casing, and is used to generate an air circulation to flow through a space between the host circuit board and the power circuit board, and wherein the air circulation sequentially flow through the space between the host circuit board and the power circuit board, the fan, and the light source.

2. The projection apparatus of claim 1, wherein the motherboard further comprises:
   a light valve control module, implemented on the host circuit board, and electrically connected to the light vale and the CPU through the host circuit board, to receive an instruction from the CPU and control the light valve.

3. The projection apparatus of claim 1, wherein the power board further comprises:
   a light source driving module, implemented on the power circuit board, and electrically connected to the light source and the CPU, to receive an instruction from the CPU and drive the light source.

4. The projection apparatus of claim 1, further comprising:
   an expansion board, comprising:
      an expansion circuit board, contained inside the casing and electrically connected to the host circuit board; and
      an expansion component, implemented on the expansion circuit board.

5. The projection apparatus of claim 4, wherein the expansion component is a video connector.

6. The projection apparatus of claim 4, wherein the expansion component is an electrical connector.

7. The projection apparatus of claim 4, wherein the expansion circuit board is parallel to the host circuit board.

8. The projection apparatus of claim 1, wherein the space between the host circuit board and the power circuit board is located at an upstream of the air circulation generated by the fan.

9. The projection apparatus of claim 8, wherein the light source is located at a downstream of the air circulation generated by the fan.

10. The projection apparatus of claim 4, wherein the casing has a first side, a second side, a third side, and a fourth side, wherein the first side is adjacent to the second side, the first side is opposite to the third side, and the second side is opposite to the fourth side, wherein the projection lens is located on the first side, and the expansion component is located on the second side.

* * * * *